United States Patent
Bond et al.

(10) Patent No.: US 10,080,458 B2
(45) Date of Patent: Sep. 25, 2018

(54) SINGLE AND MULTI-LEVEL STIRRER AND DISPENSER

(71) Applicant: Nostalgia Products LLC, Green Bay, WI (US)

(72) Inventors: Gregg Bond, Beverly Hills, CA (US); Edward E. Boughton, III, Ventura, CA (US)

(73) Assignee: NOSTALGIA PRODUCTS LLC, Green Bay, WI (US)

(*) Notice: Subject to any disclaimer, the term of this patent is extended or adjusted under 35 U.S.C. 154(b) by 50 days.

(21) Appl. No.: 14/991,514

(22) Filed: Jan. 8, 2016

(65) Prior Publication Data
US 2017/0196396 A1    Jul. 13, 2017

(51) Int. Cl.
A47J 31/00    (2006.01)
A47J 31/06    (2006.01)

(52) U.S. Cl.
CPC ........... *A47J 31/007* (2013.01); *A47J 31/06* (2013.01)

(58) Field of Classification Search
CPC ...... A47J 31/007; A47J 31/06; A47J 31/0663; A47J 2031/165
USPC ..... 99/287, 291, 302 R, 304, 306, 316, 317, 99/348, 277.2, 409; 220/4.27
See application file for complete search history.

(56) References Cited

U.S. PATENT DOCUMENTS

| | | | | |
|---|---|---|---|---|
| 76,514 A | * | 4/1868 | Patterson et al. ... | A47J 31/0663 99/288 |
| 82,976 A | * | 10/1868 | Murch ................... | A47J 31/10 99/288 |
| 84,830 A | * | 12/1868 | Jones ...................... | A47J 31/02 99/306 |
| 328,585 A | * | 10/1885 | Hornbostel ......... | B01F 7/00908 209/465 |
| 367,240 A | * | 7/1887 | Salmon .................. | A47J 31/10 126/275 R |
| 975,380 A | * | 11/1910 | Berntson ................ | B01F 15/00 261/32 |
| 1,020,814 A | * | 3/1912 | Fay ......................... | B01F 15/00 261/87 |
| 1,040,664 A | * | 10/1912 | Griffith et al. ........ | B01F 15/00 261/87 |
| 1,171,675 A | * | 2/1916 | Sparber .................. | A47J 31/06 99/298 |
| 1,225,690 A | * | 5/1917 | Wiberg .................. | A47J 31/06 99/287 |

(Continued)

*Primary Examiner* — David Angwin
*Assistant Examiner* — Jimmy Chou
(74) *Attorney, Agent, or Firm* — Womble Bond Dickinson (US) LLP

(57) ABSTRACT

A single or multi-level stirrer and dispenser having a base with a motor and preferably at least two beverage infusers, a first one placed on top of the base and the second placed on top of the first infuser, with any subsequent infusers stacked top of a lower infuser. Each infuser includes a receiving spindle affixed to its bottom. A stirrer with an axle and at least one blade extending from the axle is insertable into the receiving spindle so that the axle rotates within the receiving spindle. Each infuser includes a cover and a discharge valve for dispensing a beverage within the infuser. A lid is removably attached to top of the last infuser. The motor includes a rotor which is removably coupled to the axle in the first infuser, and each axle in each of the infusers is removably coupled to the axle in an adjacent infuser.

7 Claims, 5 Drawing Sheets

(56) References Cited

U.S. PATENT DOCUMENTS

| | | | | |
|---|---|---|---|---|
| 1,272,222 A | * | 7/1918 | Clayton | A47J 27/60 220/23.87 |
| 1,450,326 A | * | 4/1923 | Maitland | C10G 31/00 159/16.3 |
| 1,469,512 A | * | 10/1923 | Hutchison | A47F 1/03 222/130 |
| 1,652,935 A | * | 12/1927 | Goldfield | A47G 19/16 99/317 |
| 2,057,430 A | * | 10/1936 | Herrera | A47J 31/007 99/291 |
| 2,414,521 A | * | 1/1947 | Gunther | A47J 31/007 165/63 |
| 2,522,102 A | * | 9/1950 | Dold | A47J 31/06 366/165.1 |
| 3,030,874 A | * | 4/1962 | Fiori | A47J 31/0663 99/287 |
| 3,041,960 A | * | 7/1962 | Hall | A47J 31/06 99/316 |
| 3,384,259 A | * | 5/1968 | Hoffstadt | A47J 47/14 206/503 |
| 4,151,792 A | * | 5/1979 | Nearhood | A47J 36/165 366/25 |
| 4,256,407 A | * | 3/1981 | Seiderman | A47J 43/046 241/46.017 |
| 4,465,376 A | * | 8/1984 | Baumgartner | B01F 7/165 34/173 |
| 4,638,928 A | * | 1/1987 | Webster | A47J 31/50 126/384.1 |
| 4,643,583 A | * | 2/1987 | Cecchini | A23G 9/106 366/149 |
| 4,680,944 A | * | 7/1987 | Menzel | A23G 9/163 165/61 |
| 4,747,696 A | * | 5/1988 | McCrory | B01F 7/1675 366/307 |
| 4,806,369 A | * | 2/1989 | Thompson | B65D 85/812 206/15 |
| 4,903,588 A | * | 2/1990 | Horiuchi | A21B 7/005 366/146 |
| 4,936,688 A | * | 6/1990 | Cornell | B01F 7/003 219/432 |
| 4,998,464 A | * | 3/1991 | Kubacki | A23G 1/18 165/94 |
| 5,013,158 A | * | 5/1991 | Tarlow | A47J 36/165 366/251 |
| 5,019,680 A | * | 5/1991 | Morino | H05B 6/6494 219/726 |
| 5,048,402 A | * | 9/1991 | Letournel | A21B 7/005 366/146 |
| 5,074,201 A | * | 12/1991 | Takeyama | A23C 20/025 366/146 |
| 5,075,234 A | * | 12/1991 | Tunac | B01F 3/04602 261/122.1 |
| 5,280,150 A | * | 1/1994 | Arai | A21B 2/00 219/726 |
| 5,535,908 A | * | 7/1996 | Sheu | B65D 81/3205 206/509 |
| 5,562,020 A | * | 10/1996 | Shigeshiro | A21B 7/005 219/492 |
| 5,671,856 A | * | 9/1997 | Lisch | A01K 97/06 206/519 |
| 5,746,113 A | * | 5/1998 | Ko | A47G 19/16 99/279 |
| 5,820,349 A | * | 10/1998 | Caillat | F04C 28/28 417/44.11 |
| 5,970,847 A | * | 10/1999 | Saltzman | A47J 31/46 366/146 |
| 5,980,099 A | * | 11/1999 | Soon | B01F 15/00448 366/204 |
| 6,026,735 A | * | 2/2000 | Waterworth | A47J 27/002 366/146 |
| 6,029,564 A | * | 2/2000 | Huang | A21B 7/005 241/37.5 |
| 6,112,649 A | * | 9/2000 | Jeong | A47J 43/0766 241/37.5 |
| 6,374,727 B1 | * | 4/2002 | Cretors | A23L 7/187 366/185 |
| 6,532,865 B1 | * | 3/2003 | Hoffman | A47J 37/1285 222/185.1 |
| 6,863,466 B2 | * | 3/2005 | Buhren | D01H 4/10 403/383 |
| 7,128,230 B2 | * | 10/2006 | Jacobson | A47J 31/50 206/508 |
| 7,353,874 B2 | * | 4/2008 | Dykstra | B01F 13/1013 137/88 |
| 7,669,732 B2 | * | 3/2010 | Njaastad | A47F 1/085 221/197 |
| 7,780,337 B2 | * | 8/2010 | Peng | A47J 27/004 366/144 |
| 9,572,443 B2 | * | 2/2017 | Osborne | A47G 21/145 |
| 2003/0198465 A1 | * | 10/2003 | Cai | A47J 31/542 392/471 |
| 2005/0109774 A1 | * | 5/2005 | Orioles | A21B 3/15 220/4.27 |
| 2006/0233039 A1 | * | 10/2006 | Dykstra | B01F 15/00207 366/8 |
| 2006/0273082 A1 | * | 12/2006 | Sellers | B65D 21/0217 220/4.27 |
| 2007/0144358 A1 | * | 6/2007 | Huang | A47J 43/0777 99/348 |
| 2008/0134905 A1 | * | 6/2008 | Peng | A47J 43/0727 99/348 |
| 2008/0223220 A1 | * | 9/2008 | Peng | A23L 7/187 99/323.5 |
| 2008/0264270 A1 | * | 10/2008 | Peng | A47J 27/004 99/331 |
| 2009/0056556 A1 | * | 3/2009 | Lin | A47G 19/22 99/289 R |
| 2009/0064867 A1 | * | 3/2009 | Peng | A47J 43/0716 99/331 |
| 2009/0229478 A1 | * | 9/2009 | Wu | A23N 1/02 99/495 |
| 2009/0260523 A1 | * | 10/2009 | Peng | A47J 27/004 99/348 |
| 2010/0278675 A1 | * | 11/2010 | Han | F04C 18/3564 418/60 |
| 2011/0027434 A1 | * | 2/2011 | Cretors | A23P 20/10 426/290 |
| 2011/0293807 A1 | * | 12/2011 | Dushine | A23L 2/39 426/519 |
| 2012/0174800 A1 | * | 7/2012 | Montavy | A47J 43/0705 99/348 |
| 2012/0189745 A1 | * | 7/2012 | DeLong | A47J 36/165 426/231 |
| 2013/0125591 A1 | * | 5/2013 | Yamamoto | C03B 5/1875 65/135.3 |
| 2014/0137750 A1 | * | 5/2014 | Arai | A47J 43/046 99/334 |
| 2014/0203010 A1 | * | 7/2014 | Alet Vidal | B01F 13/0033 219/621 |
| 2015/0201787 A1 | * | 7/2015 | Holzbauer | A47J 43/046 99/348 |

\* cited by examiner

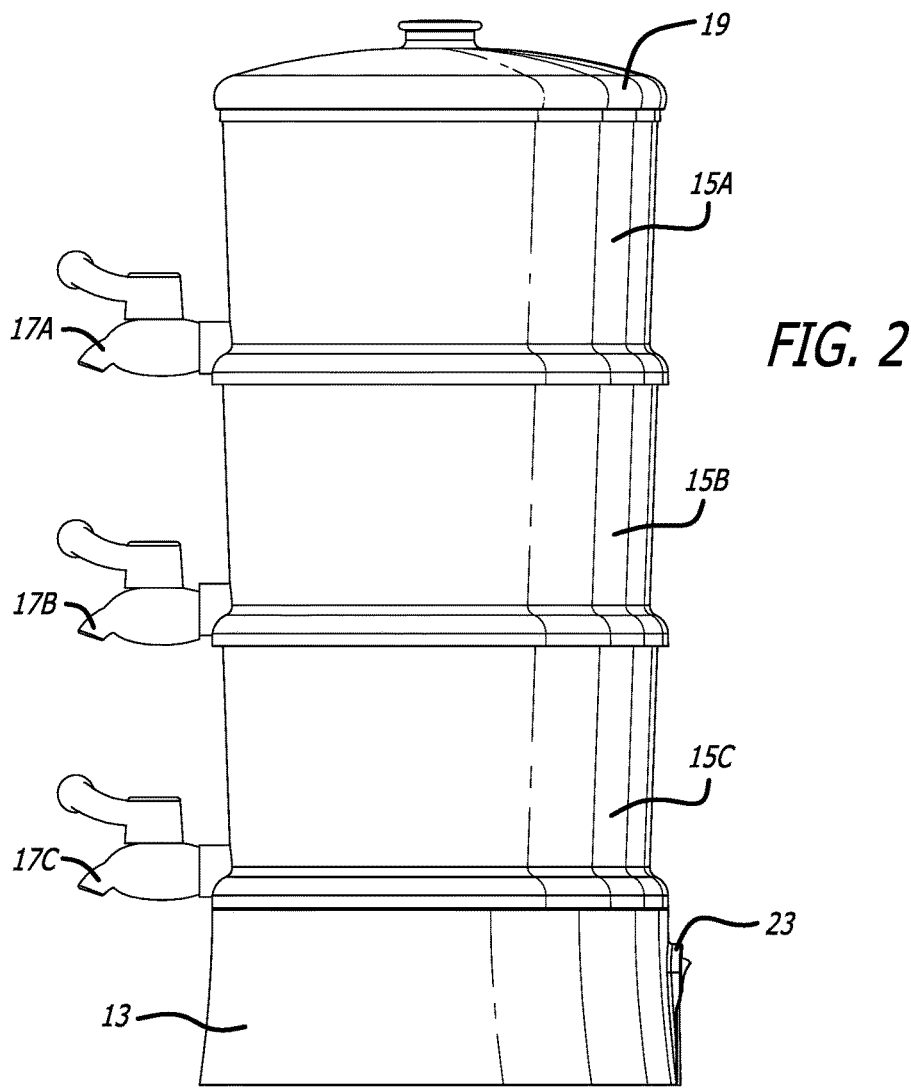
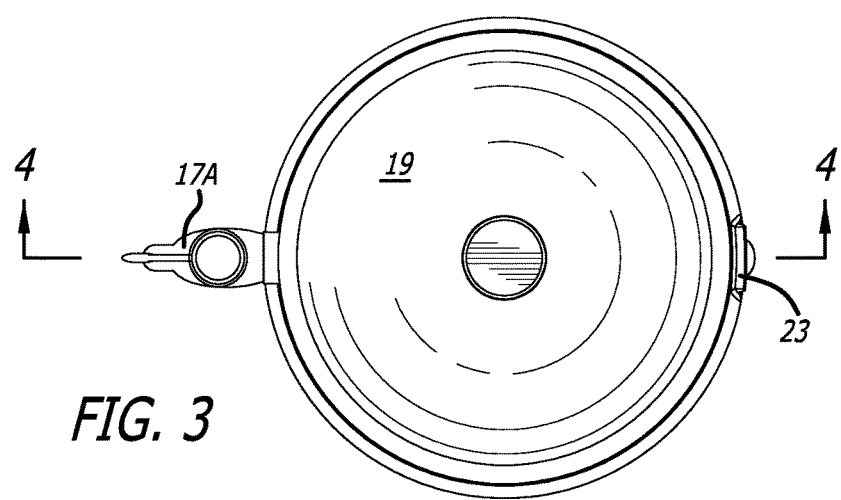

SINGLE AND MULTI-LEVEL STIRRER AND DISPENSER

BACKGROUND

The present invention relates to an apparatus for preparing beverages with an infusion flavoring mechanism, along with a valve for dispensing the flavored beverage into a cup, glass or the like.

Such devices are generally known in the art. For example, containers which may be filled with water along with one or more teabags having a dispensing valve are well-known. Such containers typically have a valve on a side wall which allows liquid to flow from inside the container to a glass or cup when the valve is opened, with the flow of the beverage stopping when the valve is closed. In use, the container is filled with, for example, water, and several teabags. The container containing the water and teabags is allowed to rest in a location, typically at room temperature or slightly higher, so that the tea contained in the teabags diffuses throughout the water in the container. The container may be refrigerated or ice may be added so that when the valve is opened, tea, at a relatively low temperature, is dispensed. Instead of or in addition to tea, fruit or other flavoring elements may be added to the liquid in the container. Such containers come in various sizes and shapes, and may be made of glass, plastic or other materials.

BRIEF SUMMARY OF THE INVENTION

The invention utilizes a container having a valve for dispensing a liquid beverage within the container, the container/valve combination hereinafter referred to as an infuser. In an embodiment, two or more infusers are stacked on top of each other. The topmost infuser is covered by a lid, and the bottommost infuser is placed on a base housing containing a motor. The motor engages an axle attached to a stirrer which is placed inside an infuser adjacent to the base housing. The stirrer is held in place by a receiving spindle integral with the bottom portion of the infuser. An axle bottom engages with the motor in the base, or an axle top of an axle in a second similarly constructed infuser. The second infuser also contains a stirrer having an axle with a top portion and a bottom portion, the bottom portion engaging with the top of the axle located in the first infuser and a top portion which engages with an axle bottom of a third infuser. Additional infusers may be placed in a similar manner. A lid is placed on to the topmost infuser which engages the axle top of the topmost infuser.

Each of the infusers is constructed in a similar manner so that any of the infusers can be the bottommost infuser, an infuser in the middle or the topmost infuser. Since the axle of each of the stirrers in each of the infusers is connected either to the motor in the base, or to the axle in an adjacent infuser, when the motor rotates, the stirrer in each of the infusers rotates since the axles in the individual infusers are connected to each other so that the rotation of each axle results in the rotation of the axle in the adjacent infuser. One or more blades attached to each of the axles results in the liquid in the infuser being stirred as the axle rotates.

Each infuser may also contains a removable perforated flavoring holder into which desired flavoring can be added. Additionally, a screen may be placed inside each infuser adjacent to the valve in order to filter any solid particles which may be contained in the liquid from being discharged with the liquid in the infuser when the valve is opened.

BRIEF DESCRIPTION OF THE DRAWINGS

FIG. 2 is a side elevation view of the beverage dispenser shown in FIG. 1.

FIG. 3 is a top plan view of the invented beverage dispenser.

DETAILED DESCRIPTION OF THE INVENTION

Figure 1:
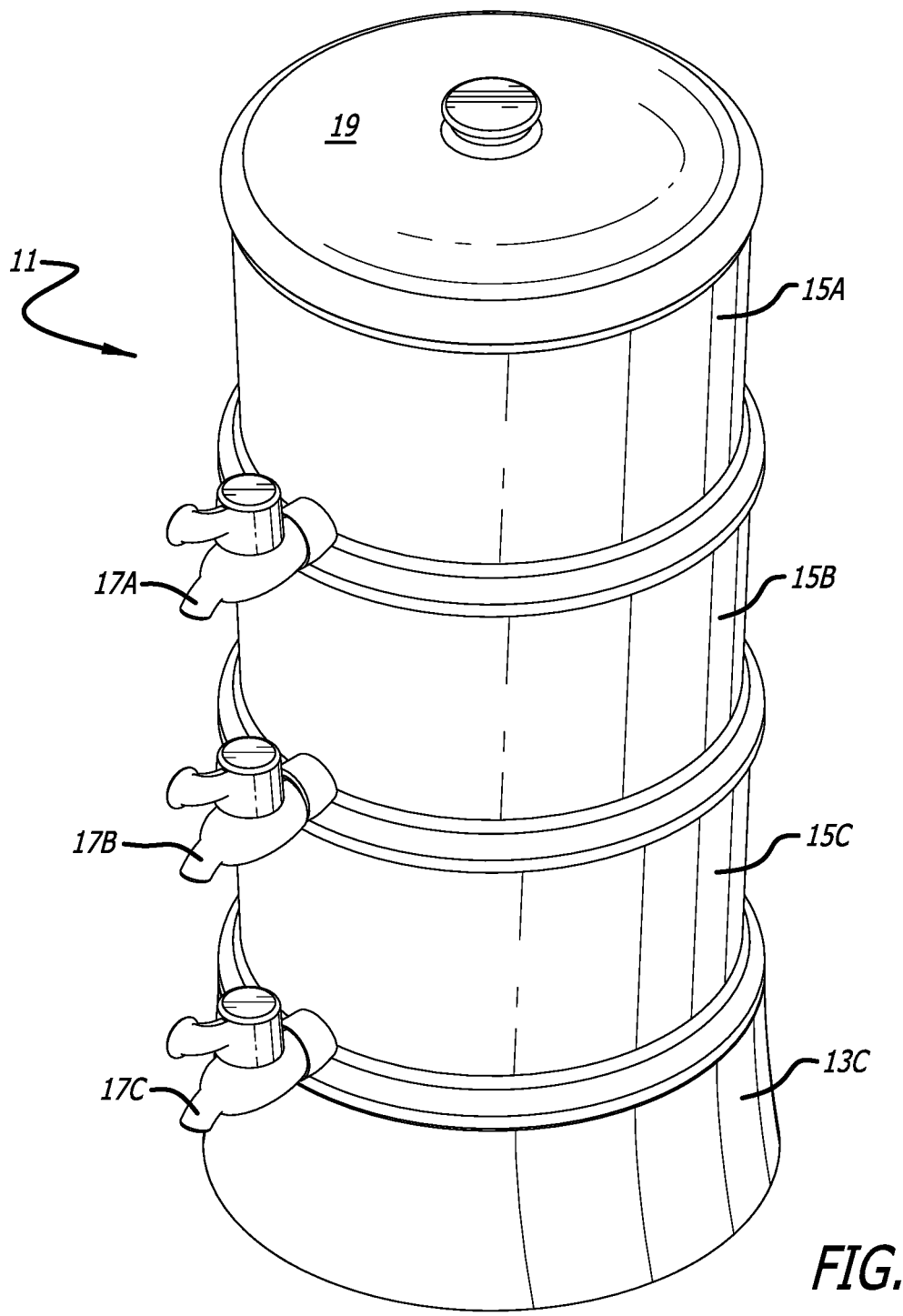
FIG. 1 is a perspective view of the invented beverage dispenser showing three beverage infusers on top of a base.

Referring first to FIG. 1, the invented stirrer and dispenser 11 includes a base 13 onto which are stacked multiple individual beverage infusers 15A, 15B and 15C, each of which has a corresponding valve 17A, 17B and 17C for dispensing liquids within each infuser. A lid 19 is placed on the top of the topmost infuser 15A. Although FIG. 1 shows three infusers, as few as one infuser can be utilized. Although, in one embodiment, the invention contemplates a minimum of two infusers being used, the number of infusers which may be utilized is mainly limited by practical considerations such as the total height of the stacked infusers, and the ability of a motor contained in base 13 to rotate stirrers within each infuser as explained in detail below.

FIG. 2 shows the invented multilevel stirrer and dispenser unit 11 with base 13 shown having a switch 23 for turning a motor contained in base 13 on and off. FIG. 3 shows a top plan view of the invented multilevel stirrer and dispenser unit.

Figure 4:
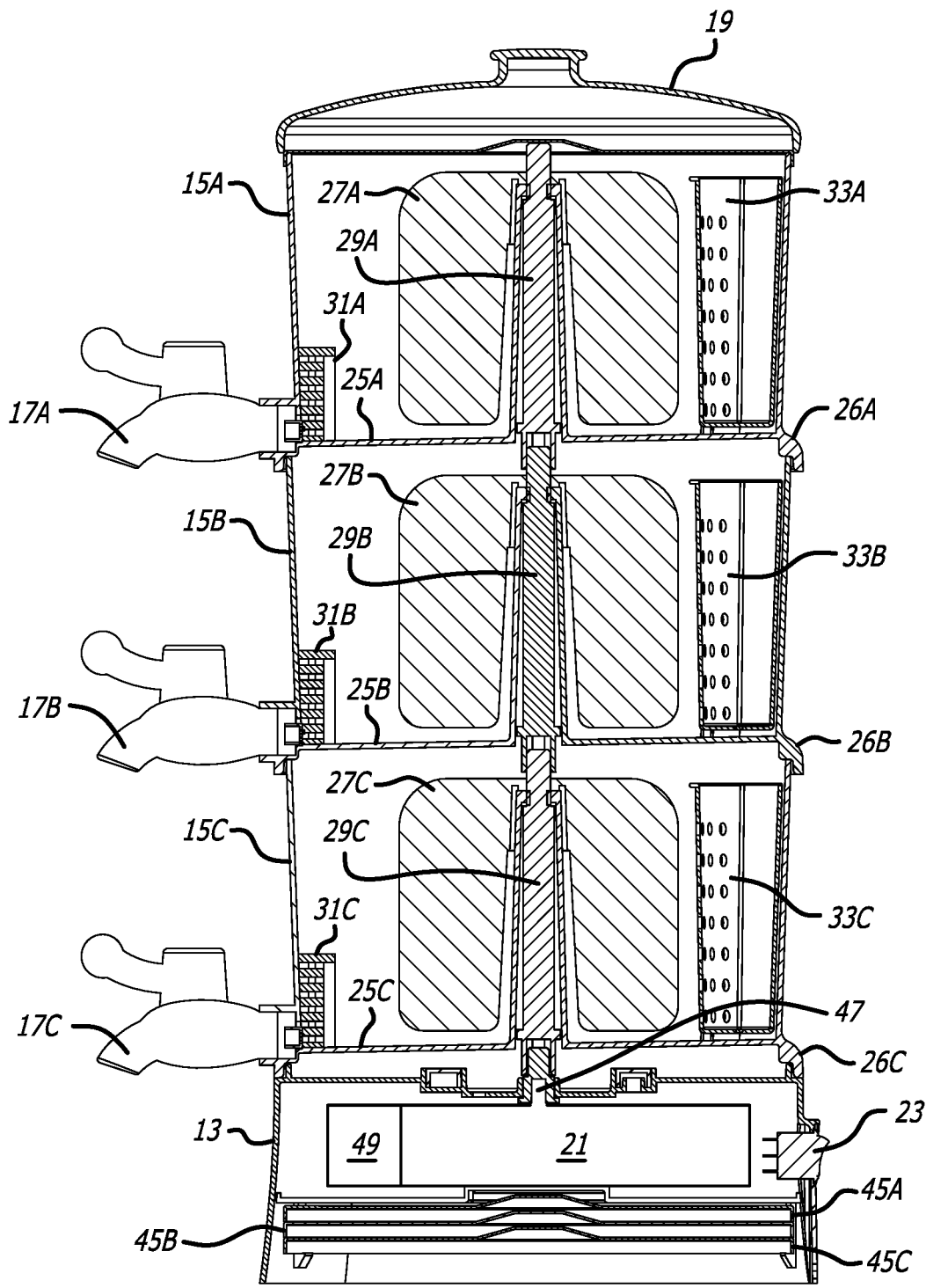
FIG. 4 is a cross-section taken along line 4-4 of FIG. 3 showing the inside of each of the three beverage infusers and the base.

Referring next to FIG. 4, a cross-section of the multilevel stirrer and dispenser unit is shown taken along line 4-4 of FIG. 3. As shown in FIG. 4, each infuser 15A, 15B and 15C includes a bottom 25A, 25B and 25C, bottom engaging portions 26A, 26B and 26C, stirrer 27A, 27B and 27C, each having a removable axle 29A, 29B and 29C, and a screen 31A, 31B and 31C. Bottom engaging portions 26a, 26b and 26c are configured to fit on top of the infuser immediately below, or base 13. The screen 31A, 31B and 31C is placed inside the infuser adjacent to valve 17A, 17B and 17C. Although not necessary for proper operation, the screen 31A, 31B and 31C is used to block particulates contained within the beverage within the infuser from being discharged with the beverage when the valve is opened.

Each infuser also includes a perforated flavoring holder 33A, 33B and 33C. The flavoring holder can be filled with a desired flavoring. Perforations within each flavoring holder cause the beverage within the infuser to flow into the flavoring holder and out of the flavoring holder to thereby impart the flavoring of the content of each flavoring holder into the beverage contained within each respective beverage infuser. The flavoring holder may contain non-soluble items such as tea leaves or any desired non-soluble or soluble flavoring. Since the beverage contained in each of the infusers is isolated from the beverage contained in another infuser, each flavoring holder, and therefore each infuser, may have one or more different flavored ingredients added.

The flavoring holder are not required. For example, rather than placing a flavoring into an flavoring holder, fruit or other flavoring element may be placed directly into the beverage. Of course, flavorings and/or fruit can also be used in combination with flavorings added to the flavoring holder.

As will be explained in more detail below, motor 21 couples to the axle 29C in the beverage infuser placed on top of base 13. In this manner, when motor 21 is turned on, it rotates axle 29C, which it turn causes blades 27C attached to axle 29C to rotate within infuser 15C. Axle 29C is in turn coupled to axle 29B in infuser 15B, and axle 29B in turn is coupled to axle 29A contained within infuser 15A. In this manner, as motor 21 rotates, the blades in each of the stacked infusers also rotate.

Figure 5:
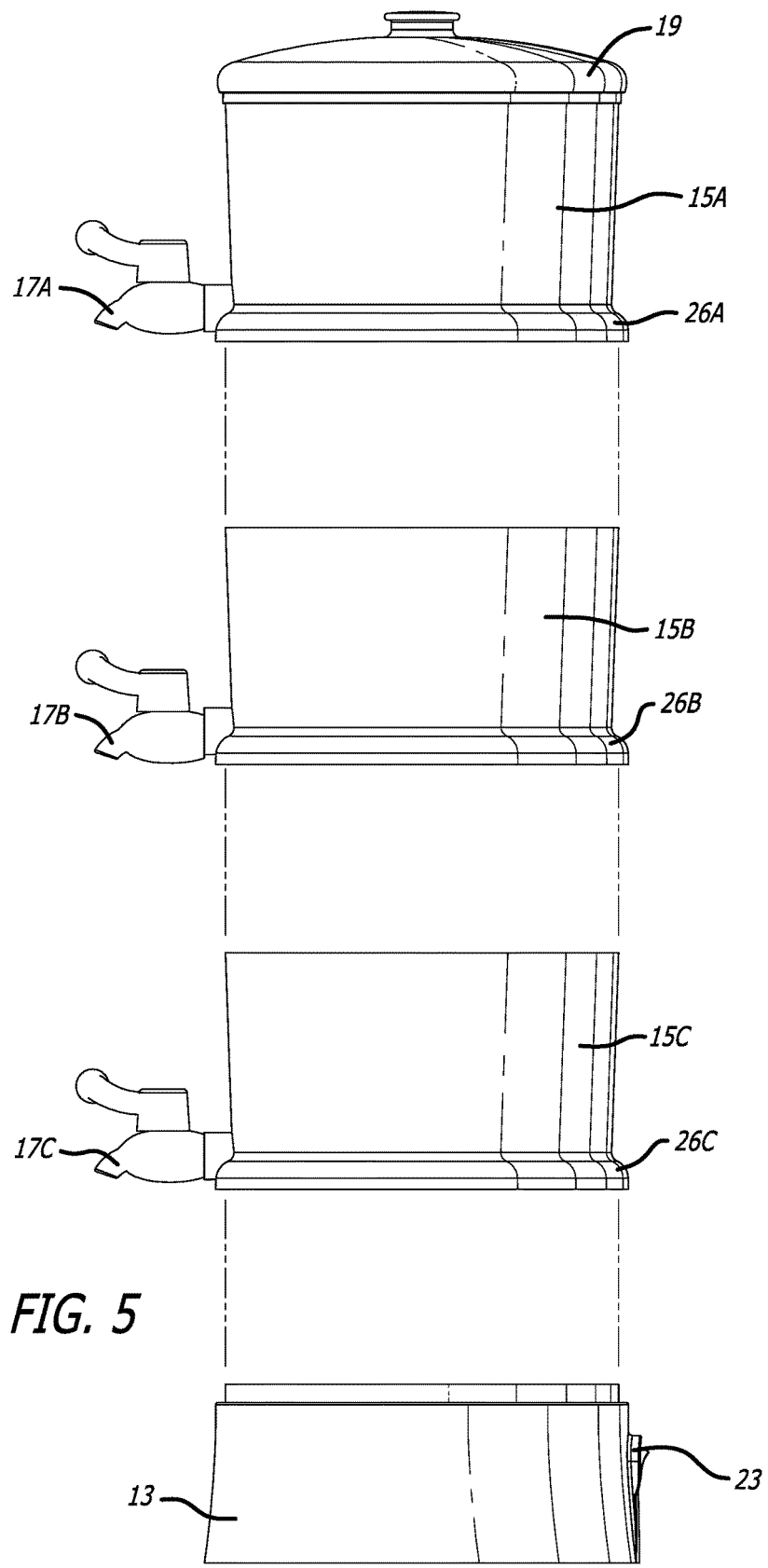
FIG. 5 shows the three separate beverage infusers separated from each other and from the base.

FIG. 5 illustrates the three infusers 15A, 15B and 15C separated from one another and from base 13, but illustrating how the three infusers and the base may be stacked on one another. For example, the infusers may be stacked and connected to each other using a tongue and groove construction between bottom engaging portions 26a, 26b and 26c and the top of each infuser 15a, 15b and 15c. The particular mechanism used for stacking the infusers is not important for a proper understanding of the invention and may be any mechanism which allows the infusers to be relatively securely connected to each other but which also allows them to be easily separated when desired.

Figure 6:
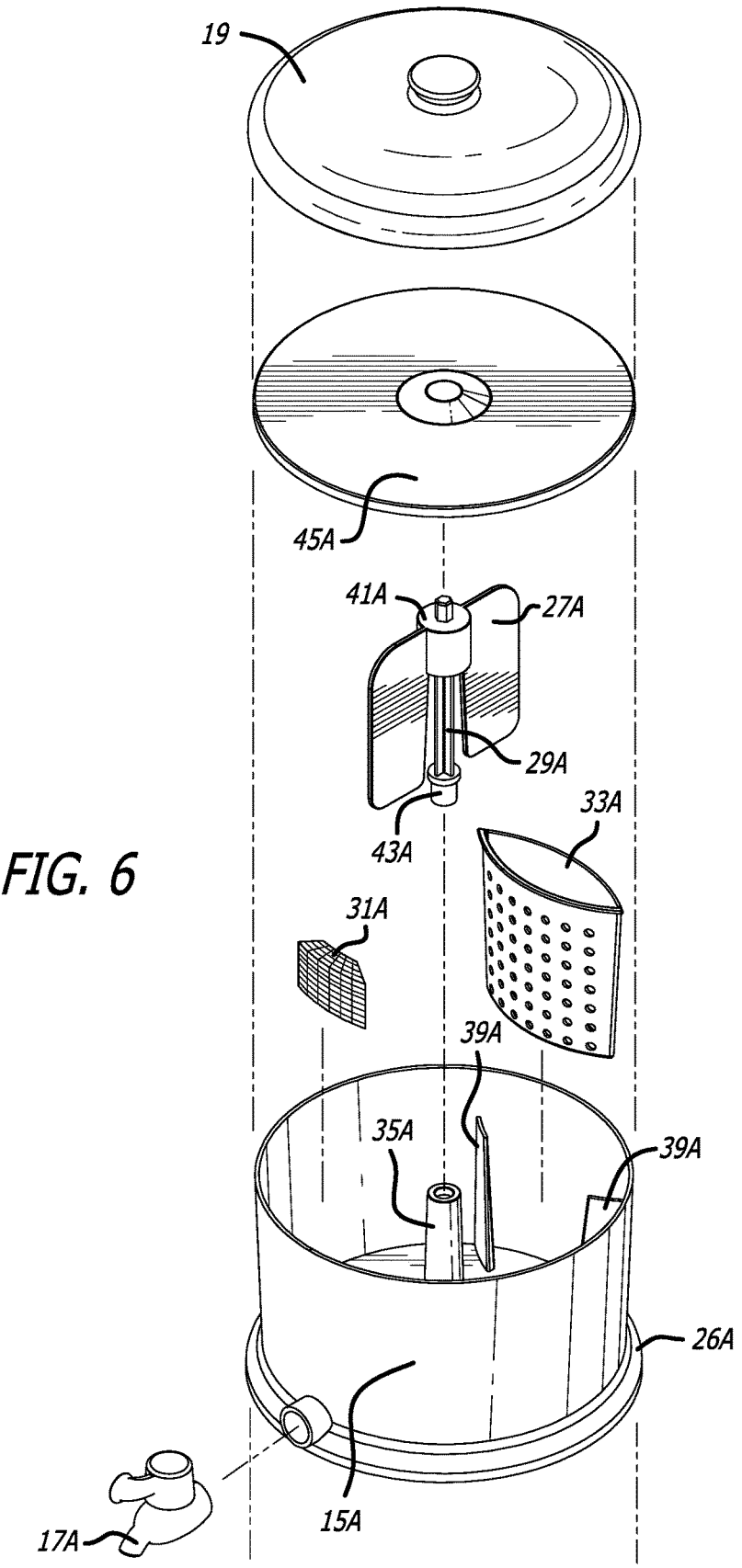
FIG. 6 is an exploded view showing the elements of one of the beverage infusers.

FIG. 6, illustrates the elements of one infuser 15A, although each of the infusers is of the same construction.

As shown in FIG. 6, a receiving spindle 35A is centered on and integral with bottom 25A. Flanges 39A extend from the inside wall of infuser 15A and are used to keep flavoring holder 33A in place during operation of the dispenser. Flanges 39A and flavoring holder 33A are sized so that the flavoring holder can be inserted into, and removed from, the infuser, the flavoring holder being held in place by friction provided by the flanges.

Axle 29A fits into an opening in receiving spindle 35A so that axle top 41A and axle bottom 43A are received by receiving spindle 35A. The inside diameter of receiving spindle 35A, and the outside diameter of axle 29A and axle bottom 43A are sized so that the axle and axle bottom fit securely within the receiving spindle, but allow for the axle to rotate within the receiving spindle. Axle top 41A is sized and shaped so as to extend and engage with the axle bottom of the infuser placed on top of that infuser. When the infuser is the topmost infuser 15A, as shown in FIG. 6, then lid 19 is placed on top of infuser 15A.

In a similar manner, referring to FIG. 4, the rotor 47 of motor 21 is sized and configured so as to fit into axle bottom 43A, 43B or 43C of the axle of the infuser placed directly onto base 13. That is, each axle bottom is sized and shaped to receive rotor 47 or axle top 41A, 41B or 41C. For example, each axle top and the rotor could have a hexagonal shaped cross section, with each axle bottom having a mating hexagonal shaped cross section so that each top and bottom fits securely with its adjacent top and bottom, or the rotor. In this manner, when rotor 47 rotates, it engages with the axle bottom of the axle in the infuser on the base to rotate that axle. That axle in turn engages with the axle bottom of the axle in the next infuser, the axle top of which in turn engages with the axle bottom of the axle in the next infuser. Of course, other cross sectional shapes could be used, so long as the two pieces can fit securely together and rotate without slippage. As noted above, this arrangement allows the stirrer in each infuser to rotate within its respective infuser so as to mix the liquid beverage and any flavorings contained in the infuser of each respective infuser. Although only one cover 45a is shown, since the infusers are each identical, independent units, each would have its one cover. In this manner, each infuser may be placed separately into a refrigerator, each protected by its own cover. In an embodiment, covers 45a, 45b and 45c for each infuser may be stored within base 13 as shown in FIG. 1. The covers may be removed from the base and used to cover each infuser when unstacked for storage. For example, after operating the infusers to produce a desired flavored beverage, each infuser may be unstacked, covered and then placed in a refrigerator to keep the beverage cool.

Although stirrer 27A, 27B and 27C are shown as having two blades extending from axle 29A, 29B and 29C, the number of blades may be less than or more than two.

Additionally, motor 21 may include a sensor 49 to sense when rotor slows down or stops rotating notwithstanding that motor 21 is receiving power. For example, if fruit in one or more of the infusers interferes with the rotating blades, the sensor detecting such change in rotational speed could send a signal to cause motor 21 to reverse direction so as to overcome the interference. Sensor 49 could also be in the nature of a timer which causes the motor to reverse direction after a period of time. The specifics of such sensor and other related mechanisms are not important to an understanding of the invention and, such specifics would be well known to persons having ordinary skill in the art and, therefore, need not be detailed herein.

The invention claimed is:

1. A multi-level stirrer and dispenser comprising:
   a) a base including a motor;
   b) at least two beverage infusers, each beverage infuser including:
      1) a bottom and a continuous side wall forming a container;
      2) a receiving spindle integral with said bottom;
      3) a stirrer having an axle and at least one blade extending from the axle, said axle insertable into said receiving spindle, said axle and receiving spindle configured to allow said axle to rotate within said receiving spindle;
      4) a discharge valve affixed to said side wall, said discharge valve disposed external to said infuser and in fluid communication with the interior of said infuser;
      5) a pair of flanges disposed within each said infuser affixed to said side wall;
      6) a perforated flavoring holder configured to be retained by said pair of flanges; wherein
   a first one of said beverage infusers is disposed on top of said base, a second one of said infusers is disposed on top of said first infuser, and
   said motor includes a rotor which is removably coupled to said axle in said first infuser, and each axle in each of said infusers is removably coupled to the axle in an adjacent infuser.

2. The multi-level stirrer and dispenser defined by claim 1 further comprising a lid disposed on a topmost one of said beverage infusers.

3. The multi-level stirrer and dispenser defined by claim 1 further comprising a screen disposed within each said infuser adjacent to said discharge valve.

4. The multi-level stirrer and dispenser defined by claim 1 further comprising a sensor coupled to said motor configured to cause said motor to reverse rotational direction under a predetermined condition.

5. The multi-level stirrer and dispenser defined by claim 4 wherein said predetermined condition is a change in rotational speed of said rotor.

6. The multi-level stirrer and dispenser defined by claim 1 further comprising a cover for removably attaching to a top portion of each said infuser.

7. The multi-level stirrer and dispenser defined by claim 6 further comprising a cover for each of said beverage infusers stored within said base.

\* \* \* \* \*